Sept. 21, 1926.
G. W. McNEAL
PISTON PACKING
Filed Oct. 11, 1923
1,600,417
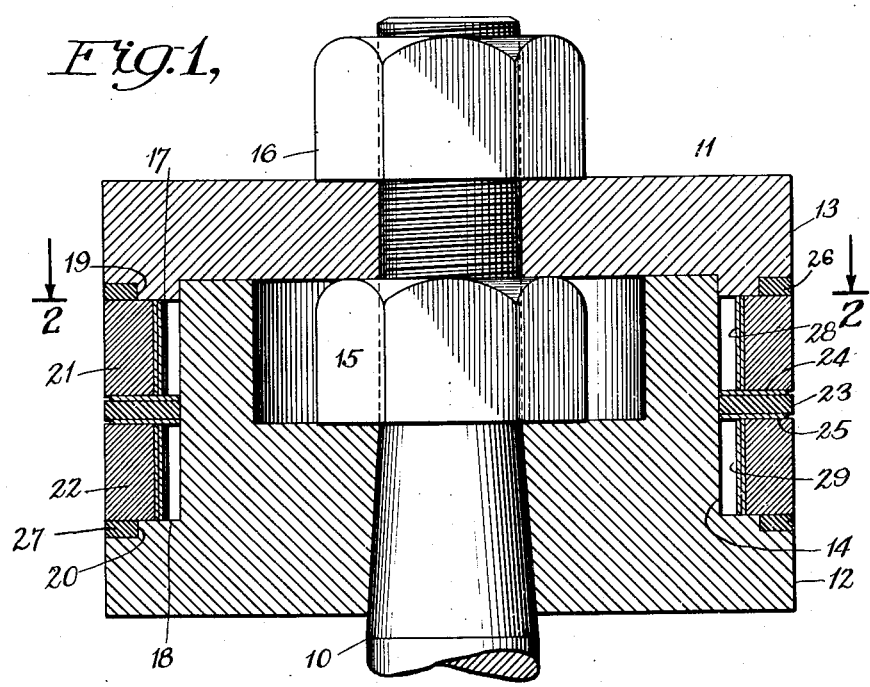
Fig.1,
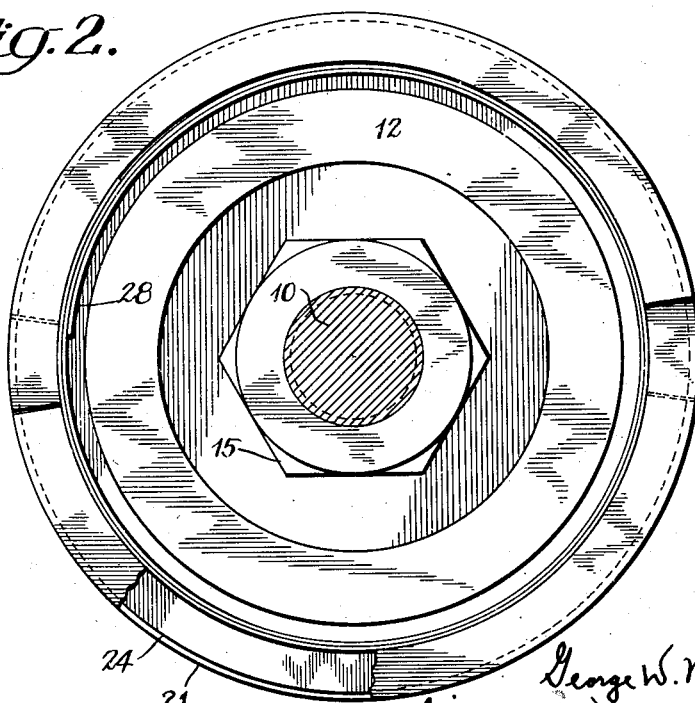
Fig.2.
Inventor
George W. McNeal
By his Attorney Patented Sept. 21, 1926.

1,600,417

UNITED STATES PATENT OFFICE.

GEORGE W. McNEAL, OF PORT NECHES, TEXAS, ASSIGNOR TO THE TEXAS COMPANY, OF NEW YORK, N. Y., A CORPORATION OF TEXAS.

PISTON PACKING.

Application filed October 11, 1923. Serial No. 667,787.

This invention relates to packing for pump pistons and particularly to packing which serves an additional function in that it simultaneously lubricates and cleans the lining of the pump casing.

It is old in the art to construct pump pistons with packing of one kind or another to prevent the escape past the piston of the fluid being pumped, but heretofore no pistons have been provided with packing material suitable not only for that purpose but also for providing suitable lubrication between the piston and the pump casing, and at the same time providing means whereby the casing and piston are maintained free from grit or dirt which, if not removed, would seriously impair the efficiency of the pump. Experience has proved that where these ends are accomplished the life of the packing is greatly prolonged thus eliminating the waste of time and money incurred when frequent changes of packing are required.

Accordingly, the primary object of the present invention is to provide a packing for pump pistons which will be durable and efficient in operation and which will render possible longer continuous runs of the pump.

Another object of the invention is to secure certain contact between the packing and the lining of the pump casing, and to maintain the lining free from dirt and grit.

Still another object is to lubricate the pump during its operation.

Other and incidental objects and advantages of the invention will appear as the description thereof proceeds.

Referring to the drawings, in which like numerals refer to like parts throughout, Figure 1 is a sectional view of a pump piston constructed in accordance with the present invention.

Figure 2 is a sectional view on the line 2—2 of Figure 1.

In the drawings, 10 represents a tapered and threaded piston rod near one end of which is secured a piston 11 comprising two separable sections 12 and 13 so formed and secured together as to provide a peripheral groove 14 around the piston. The sections 12 and 13 are secured together and to the rod 10 by means of nuts 15 and 16. The sections 12 and 13 are each formed with projections 17 and 18 forming shoulders 19 and 20.

The packing material is composed of a plurality of rings and positioned in one or more peripheral grooves, such as the groove 14. It comprises a pair of spaced split rings 21 and 22 composed of a suitable lubricating metal, preferably a Babbitt metal containing a quantity of graphite which has well known lubricating properties. A spacer ring 23 composed of either brass or composition board, preferably brass, is positioned between the lubricating rings 21 and 22 and separated therefrom by means of metal washers 24 and 25. Preferably, the washers do not project outwardly as far as the spacer ring 23 so that there is a small space between the outer edges of the ring 23 and the lubricating rings 21 and 22. Composition board or fibre rings 26 and 27, in the nature of wipers, are disposed preferably on either side of the series of lubricating rings. The wiper rings are shown as being seated upon the shoulders 19 and 20 outwardly of the rings 21 and 22.

The lubricating rings 21 and 22 are pushed or pressed outwardly so as to firmly contact with the cylinder walls (not shown) by means of metallic springs 28 and 29, respectively. The springs are prevented from contacting with the spacer ring 23 by the washers 24 and 25. As is apparent from the drawings, these spring steel rings are disposed in the peripheral groove 14 behind the lubricating rings 21 and 22 upon which they exert a continuous outward pressure.

From the foregoing it is readily apparent that on each stroke of the piston within the pump cylinder (not shown) the lubricating metal rings will bear against the cylinder wall and lubricate it. As the fibre board rings or wipers are disposed outwardly of the lubricating rings it will be seen that upon each stroke of the piston a wiper follows the lubricating rings and cleans and polishes the casing with which it comes in contact.

Apparatus of preferred form and construction has been illustrated and described for the purpose of showing a way in which this invention may be constructed, but the inventive thought upon which this application is based is broader than this illustrative embodiment thereof. It is, therefore, understood that the scope of the invention is not to be limited by the present disclosure, reference being had to the appended claims for that purpose.

What I claim is—

1. The combination with a pump piston having a peripheral groove, of a plurality of spaced lubricating rings disposed in the peripheral groove and composed partially of graphite, means for exerting continuous outward pressure on said rings, a metallic spacer disposed between said lubricating rings, and wiper rings of hard wood fibre disposed outwardly of the lubricating rings.

2. A pump piston having on the periphery thereof a plurality of spaced fibre board rings and spring-pressed metallic lubricating rings.

3. A piston comprising a pair of separable sections formed to provide, when secured together, a peripheral groove around the piston, spring-pressed spaced lubricating rings disposed in the groove so formed, a spacer ring interposed between the lubricating rings, and fibre board wiper rings disposed in the periphery of the piston outwardly of the lubricating rings.

In witness whereof I have hereunto set my hand this 28th day of September, 1923.

GEORGE W. McNEAL.